(12) United States Patent
Kim et al.

(10) Patent No.: US 11,067,680 B2
(45) Date of Patent: Jul. 20, 2021

(54) METHOD AND APPARATUS FOR MEASURING DISTANCE

(71) Applicant: SAMSUNG ELECTRONICS CO., LTD., Suwon-si (KR)

(72) Inventors: Jong-sok Kim, Hwaseong-si (KR); Donghan Kim, Osan-si (KR); Sungdo Choi, Suwon-si (KR); Jaesup Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 411 days.

(21) Appl. No.: 15/861,034

(22) Filed: Jan. 3, 2018

(65) Prior Publication Data
US 2019/0049569 A1 Feb. 14, 2019

(30) Foreign Application Priority Data

Aug. 8, 2017 (KR) .......................... 10-2017-0100236

(51) Int. Cl.
| | | |
|---|---|---|
| *G01S 13/34* | (2006.01) | |
| *G01S 13/28* | (2006.01) | |
| *G01S 17/87* | (2020.01) | |
| *G01S 13/93* | (2020.01) | |
| *G01S 13/931* | (2020.01) | |
| *G01S 7/35* | (2006.01) | |
| *G01S 13/58* | (2006.01) | |

(52) U.S. Cl.
CPC ............. *G01S 13/34* (2013.01); *G01S 7/352* (2013.01); *G01S 13/282* (2013.01); *G01S 13/343* (2013.01); *G01S 13/93* (2013.01); *G01S 13/931* (2013.01); *G01S 17/87* (2013.01); *G01S 13/583* (2013.01)

(58) Field of Classification Search
CPC .................................. G01S 13/84; G01S 7/352
USPC ....................................................... 342/70–72
See application file for complete search history.

(56) References Cited

U.S. PATENT DOCUMENTS

| | | | | |
|---|---|---|---|---|
| 6,010,035 | A * | 1/2000 | Estruch .................. | A23G 9/045 222/142 |
| 9,575,160 | B1 * | 2/2017 | Davis ...................... | G01S 7/352 |
| 2002/0190894 | A1 | 12/2002 | Mitsumoto et al. | |
| 2004/0051660 | A1 | 3/2004 | Kai | |
| 2008/0245819 | A1 * | 10/2008 | Galarce ..................... | A23L 2/56 222/129 |
| 2009/0309782 | A1 * | 12/2009 | Takabayashi ......... | G01S 13/343 342/105 |
| 2009/0322591 | A1 | 12/2009 | Matsuoka | |
| 2011/0234448 | A1 * | 9/2011 | Hayase ................. | G01S 13/345 342/70 |

(Continued)

FOREIGN PATENT DOCUMENTS

KR 10-2010-0004535 A 1/2010

*Primary Examiner* — Marcus E Windrich
(74) *Attorney, Agent, or Firm* — NSIP Law

(57) ABSTRACT

A distance measuring method and apparatus are provided. The distance measuring apparatus emits a transmission signal while changing a frequency over time, receives a reception signal from an object in response to the transmission signal being reflected from the object, samples a beat frequency indicating a difference between a frequency of the transmission signal and a frequency of the reception signal in a sampling range that changes based on the beat frequency, and determines a distance to the object based on the sampling.

14 Claims, 5 Drawing Sheets

(56) References Cited

U.S. PATENT DOCUMENTS

| | | | |
|---|---|---|---|
| 2012/0242972 A1* | 9/2012 | Wee | G01S 7/486 |
| | | | 356/4.01 |
| 2013/0234880 A1* | 9/2013 | Lee | G01S 13/584 |
| | | | 342/70 |
| 2016/0084952 A1* | 3/2016 | Karlapalem | A61H 23/02 |
| | | | 342/118 |
| 2016/0178739 A1* | 6/2016 | Lee | G01S 7/35 |
| | | | 342/27 |
| 2016/0299222 A1* | 10/2016 | Watanabe | G01S 13/532 |
| 2017/0074974 A1 | 3/2017 | Rao et al. | |
| 2020/0180262 A1* | 6/2020 | Sun | H01Q 17/007 |
| 2020/0191904 A1* | 6/2020 | Sakurai | H01Q 1/3233 |
| 2020/0200896 A1* | 6/2020 | Shan | G01S 13/931 |
| 2020/0217924 A1* | 7/2020 | Kashiwagi | G01S 7/35 |

* cited by examiner

METHOD AND APPARATUS FOR MEASURING DISTANCE

CROSS-REFERENCE TO RELATED APPLICATIONS

This application claims the benefit under 35 USC § 119(a) of Korean Patent Application No. 10-2017-0100236, filed on Aug. 8, 2017, in the Korean Intellectual Property Office, the entire disclosure of which is incorporated herein by reference for all purposes.

BACKGROUND

1. Field

The following description relates to a technology of measuring a distance to an object using electromagnetic waves.

2. Description of Related Art

As development of autonomous vehicles is accelerating, safety of autonomous vehicles becomes increasingly important. An advanced driver-assistance system (ADAS) creates a safe driving environment by autonomously controlling a vehicle based on information about external environment. To acquire the information about the external environment in the ADAS sensors such as, a radio detection and ranging (RADAR) sensor, a light detection and ranging (LiDAR) sensor or a camera are used.

The RADAR sensor measures or senses a location of the object by radiating an electromagnetic wave to analyze a change in a waveform of a reception signal and an amount of time in which the radiated electromagnetic wave is reflected from an object and returns to the sensor. The RADAR sensor shows robust performance in external environment when compared to an optical-based sensor, for example, a camera, and is better in cost-performance when compared to a LiDAR sensor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a distance measuring method including emitting a transmission signal while changing a frequency over time, receiving a reception signal from an object, in response to the transmission signal being reflected from the object, sampling a beat frequency indicating a difference between a frequency of the transmission signal and a frequency of the reception signal in a sampling range that changes based on the beat frequency, and determining a distance to the object based on the sampling.

A first sampling range corresponding to a first beat frequency may be lesser than a second sampling range corresponding to a second beat frequency that may be greater than the first beat frequency.

A first sampling range corresponding to a first beat frequency may be greater than a second sampling range corresponding to a second beat frequency that may be greater than the first beat frequency.

The frequency of the transmission signal may change with time.

The frequency of the transmission signal linearly may change with time for a single period.

The determining of the distance may include calculating the distance to the object based on the difference between the frequency of the transmission signal and the frequency of the reception signal.

The distance measuring method may include converting an original signal having a low frequency to the transmission signal having a high frequency, based on a carrier frequency, and converting the reception signal to the original signal based on the carrier frequency.

The transmission signal may be transmitted by a radio detection and ranging (RADAR) antenna, and the reception signal may be received by the RADAR antenna.

The sampling range may vary based on the distance of the object from the vehicle.

The distance measuring method may include narrowing the sampling range, in response to the beat frequency being substantially equal to a threshold value.

The distance measuring method may include narrowing the sampling range, in response to a decrease in the beat frequency.

In another general aspect, there is provided a distance measuring apparatus including an antenna, a processor configured to emit a transmission signal using the antenna while changing a frequency over time, receive a reception signal from an object using the antenna in response to the transmission signal being reflected from the object, sample a beat frequency indicating a difference between a frequency of the transmission signal and a frequency of the reception signal in a sampling range that changes based on the beat frequency, and determine a distance to the object based on the sampling.

A first sampling range corresponding to a first beat frequency may be lesser than a second sampling range corresponding to a second beat frequency that may be greater than the first beat frequency.

A first sampling range corresponding to a first beat frequency may be greater than a second sampling range corresponding to a second beat frequency that may be greater than the first beat frequency.

The frequency of the transmission signal may linearly change with time for a single period.

The processor may be configured to determine the distance to the object based on the difference between the frequency of the transmission signal and the frequency of the reception signal.

The distance measuring apparatus may include an oscillator configured to generate a carrier frequency, an upconverter configured to convert an original signal having a low frequency to the transmission signal having a high frequency based on the carrier frequency, and a downconverter configured to convert the reception signal to the original signal based on the carrier frequency.

Other features and aspects will be apparent from the following detailed description, the drawings, and the claims.

Figure 1:
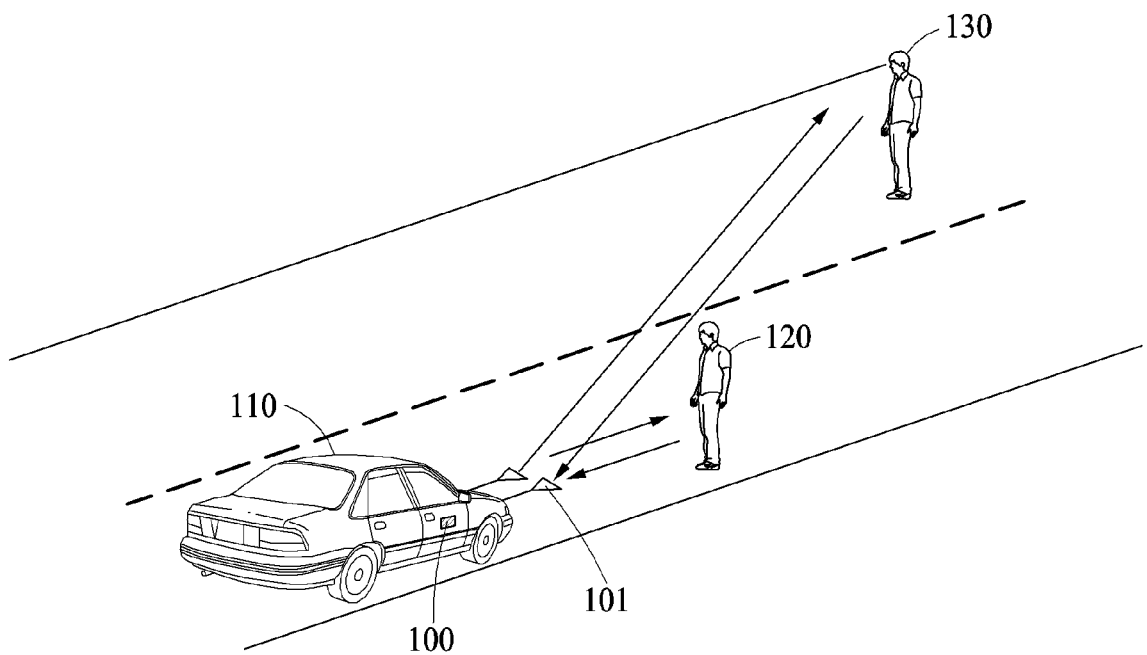
FIG. 1 illustrates an example of measuring a distance from a vehicle to an object using a radio detection and ranging (RADAR) antenna.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Terms such as first, second, A, B, (a), (b), and the like may be used herein to describe components. Each of these terminologies is not used to define an essence, order, or sequence of a corresponding component but used merely to distinguish the corresponding component from other component(s). For example, a "first" component may be referred to as a "second" component, or similarly, and the "second" component may be referred to as the "first" component within the scope of the right according to the concept of the present disclosure.

If it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

As used herein, the singular forms are intended to include the plural forms as well, unless the context clearly indicates otherwise.

FIG. 1 illustrates an example of measuring a distance from a vehicle 110 to an object 120 or 130 using a radio detection and ranging (RADAR) antenna.

Referring to FIG. 1, the vehicle 110 measures a distance to the object 120 and a distance to the object 130, using a distance measuring apparatus 100. The object 120 is located closer to the vehicle 110 and the object 130 is located farther away from the vehicle 110. The vehicle 110 emits a transmission signal using an antenna 101, and receives a reception signal coming from the object 120 or 130 when the transmission signal is reflected from the object 120 or 130. The distance measuring apparatus 100 adjusts a sampling range used to sample the reception signal so that a degree of precision of a measurement varies depending on a distance. The sampling range may be referred to as a "sampling gate."

In an example, distance measuring apparatus 100 is provided in various vehicles. The vehicle refers to any mode of transportation, delivery, or communication such as, for example, for example, an automobile, a truck, a tractor, a scooter, a motorcycle, a cycle, an amphibious vehicle, a snowmobile, a boat, a public transit vehicle, a bus, a monorail, a train, a tram, an autonomous vehicle, an unmanned aerial vehicle, or a drone.

In an example, the distance measuring apparatus 100 is incorporated in vehicular guidance apparatuses such as, for example, cruise control, adaptive cruise control, lane keeping assist system, and land departure warning system.

In an example, when the vehicle includes an advanced driver-assistance system (ADAS) to enhance a safety and convenience of driving by identifying an external risk, such as, for example, an obstacle or another vehicle, using various sensors that are included inside or outside a vehicle. The distance measuring apparatus 100 is used in the ADAS to set a distance to an external object using a sensor.

In another example, the distance measuring apparatus 100 is included in another device placed in the vehicle. In an example, the distance measuring apparatus 100 is embodied or incorporated in various types of products such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, a personal computer (PC), a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, a high definition television (HDTV), a smart appliance, communication systems, image processing systems, graphics processing systems, various Internet of Things (IoT) devices that are controlled through a network, a smart vehicle, an intelligent automobile, an autonomous driving vehicle, other consumer electronics/information technology (CE/IT) device, or any other device capable of wireless communication or network communication consistent with that disclosed herein.

In another example the distance measuring apparatus 100 is external to the vehicle, and is disposed in a device, such as, for example, a computer, a server, and a mobile phone, and communicates with the vehicle through wireless communication or network communication consistent with the disclosed herein.

The antenna 101 used by the distance measuring apparatus 100 includes, for example, a RADAR antenna. The RADAR antenna is used to measure information about a movement, a shape or a location of an object based on radio waves. The RADAR antenna radiates a radio wave, and receives a radio wave reflected from an object (for example, the object 120 or 130) that is in a propagation direction of the radio wave, back to the RADAR antenna.

In an example, the distance measuring apparatus 100 emits a transmission signal having a modulated frequency using the antenna 101. In an example, the distance measuring apparatus 100 emits a transmission signal having a frequency that changes with time. In another example, the distance measuring apparatus 100 emits a transmission signal having a frequency that linearly changes with time for a single period. The distance measuring apparatus 100 uses, for example, a frequency-modulated continuous-wave (FMCW) scheme to emit a transmission signal.

An RADAR using FMCW is RADAR using a continuous wave configured to continue to radiate and receive electromagnetic waves. Because electromagnetic waves are continuously received as continuous waves, it is difficult to know a reception signal corresponding to an electromagnetic wave radiated at a first point in time. The FMCW RADAR periodically modulates a frequency with time and changes a frequency phase at each point in time, and accordingly it is possible to know the reception signal corresponding to the electromagnetic wave radiated at the first point in time by measuring a phase of a reception signal. Also, the FMCW RADAR is suitable for real-time tracking because a reception signal is continuously received, however, a data throughput relatively increases.

The distance measuring apparatus 100 receives a reception signal in real time and measures a distance. When a sampling range to sample a reception signal becomes narrower, an accuracy of a measurement of the reception signal, and an accuracy of a measurement of a distance between the vehicle 110 and the object 120 or 130 increase. However, when the sampling range becomes narrower, a quantity of data that needs to be processed in real time increases and a throughput decreases, thus, it is or it is unfeasible to process the data in real time.

For example, the distance measuring apparatus 100 needs to more precisely identify the object 120 located at a shorter distance than the object 130 located at a longer distance, or needs to more precisely identify the object 130 than the object 120.

In this example, when the vehicle 110 operates, a risk of a collision with the object 120 is higher than a risk of a collision with the object 130 because the object 120 is located closer to the vehicle 110. For example, it is difficult to distinguish a person who slowly moves from a stationary object. Accordingly, a risk of a collision between the vehicle 110 and a person close to the vehicle 110 increases.

The vehicle 110 more precisely measures the distance to the object 120, to mitigate a collision risk. For example, the distance measuring apparatus 100 sets a sampling range to vary depending on purposes of measurement under constraints including a limited operation capability. In an example, by setting a sampling range corresponding to a low beat frequency for a reception signal to be less than a sampling range corresponding to a high beat frequency, the distance measuring apparatus 100 more precisely measures the distance to the object 120 at the short distance. A beat frequency indicates a difference between a frequency of the transmission signal and a frequency of the reception signal.

The distance measuring apparatus 100 sets a non-linear sampling range corresponding to a beat frequency. For example, the distance measuring apparatus 100 sets a sampling range to be narrow for a low beat frequency, and sets a sampling range to be wide for a high beat frequency. In this example, a difference between the high beat frequency and the low beat frequency is non-linear to a difference between the narrow sampling range and the wide sampling range.

Thus, it is possible to increase an accuracy of a measurement of a distance to a close object, instead of laying an additional burden on a processing speed or an operation capability because a total number of sampling ranges is maintained. The distance measuring apparatus 100 accurately measures a distance to a close object, and thus it is possible to mitigate a risk of a collision with an object, such as a person, that slowly moves.

Figure 2:
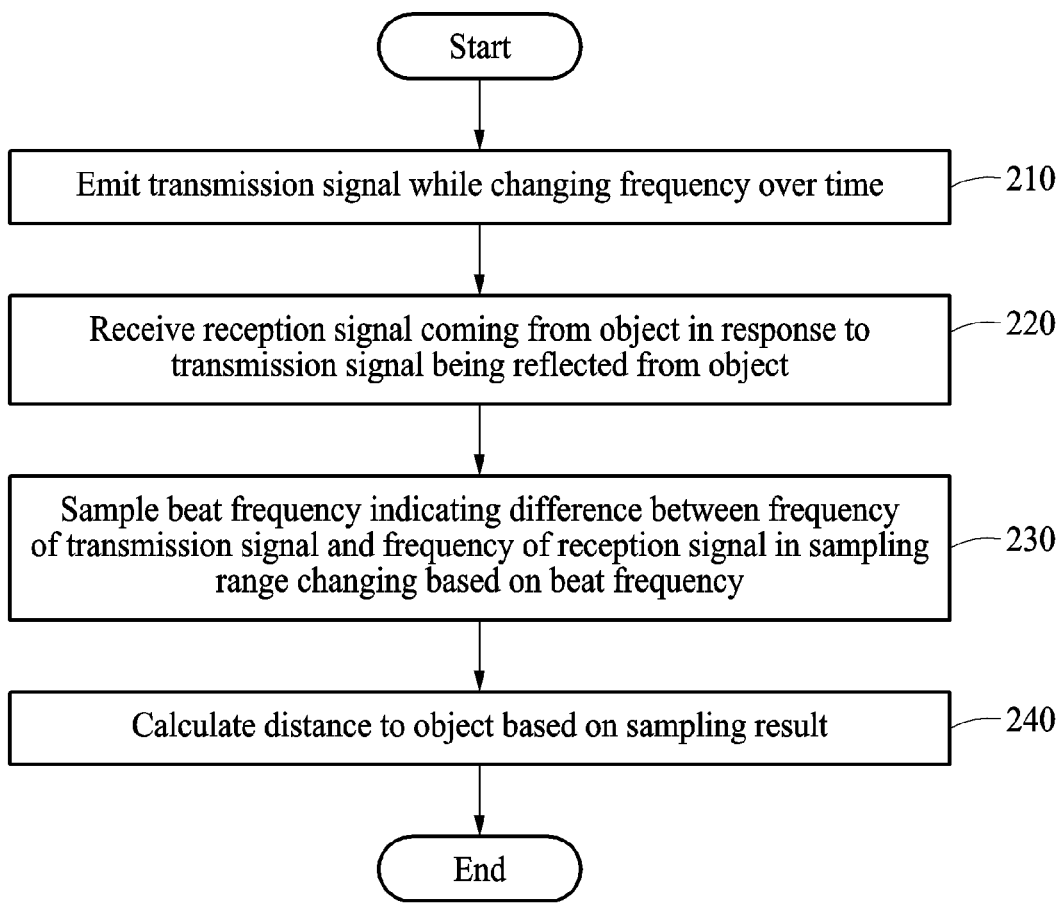
FIG. 2 illustrates an example of a distance measuring method.

FIG. 2 illustrates an example of a distance measuring method. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 is also applicable to FIG. 2, and are incorporated herein by reference. Thus, the above description may not be repeated here.

Referring to FIG. 2, in operation 210, the distance measuring apparatus 100 of FIG. 1 emits a transmission signal while changing a frequency over time. In an example, the distance measuring apparatus 100 emits a transmission signal while changing a frequency over time periodically. In another example, the distance measuring apparatus 100 periodically emits a transmission signal having a frequency that increases over time for a single period. In another example, the distance measuring apparatus 100 periodically emits a transmission signal having a frequency that linearly increases over time for a single period. The distance measuring apparatus 100 uses, for example, an FMCW scheme to emit a transmission signal.

In operation 220, the distance measuring apparatus 100 receives a reception signal coming from an object when the transmission signal is reflected from the object. Because a reception signal arrives quickly from a close object to the distance measuring apparatus 100 when the transmission signal is reflected from the close object in comparison to a reception signal coming from a distant object, a time of flight (TOF) for the close object is less than a TOF for the distant object.

In operation 230, the distance measuring apparatus 100 samples a beat frequency indicating a difference between a frequency of the transmission signal and a frequency of the reception signal in a sampling range that changes based on the beat frequency. A phase of a transmission signal is different from a phase of the reception signal by a sum of an amount of time in which the transmission signal is emitted from the antenna and arrives at the object and an amount of time in which the transmission signal is reflected from the object back to the antenna.

In an example, a first sampling range corresponding to a first beat frequency is less than a second sampling range corresponding to a second beat frequency, which is greater than the first beat frequency. When a beat frequency decreases, a sampling range used by the distance measuring apparatus 100 to sample a reception signal becomes narrower. Thus, it is possible to more accurately identify a close object, and to accurately calculate a distance from a vehicle to the identified object.

In another example, a first sampling range corresponding to a first beat frequency is greater than a second sampling range corresponding to a second beat frequency, which is greater than the first beat frequency. When a beat frequency increases, a sampling range used by the distance measuring apparatus 100 to sample a reception signal becomes narrower. Thus, it is possible to more accurately identify a distant object, and to accurately calculate a distance from a vehicle to the identified object.

In still another example, a second sampling range corresponds to a second beat frequency that is greater than a first beat frequency and less than a third beat frequency. The second sampling range is less than a first sampling range corresponding to the first beat frequency and a third sampling range corresponding to the third beat frequency. In this example, the distance measuring apparatus 100 more accurately calculates a distance to an object located at a distance corresponding to the second beat frequency.

A distance from a vehicle to an object or a speed of the object is calculated based on a delay time between the transmission signal and the reception signal and the difference between the frequency of the transmission signal and the frequency of the reception signal.

In operation 240, the distance measuring apparatus 100 calculates a distance to the object based on a sampling result obtained in operation 230. The distance measuring apparatus 100 calculates the distance to the object based on the difference between the frequency of the transmission signal and the frequency of the reception signal.

The distance measuring apparatus 100 emits a transmission signal having a modulated frequency, using an antenna. In an example, the distance measuring apparatus 100 generates a transmission signal by modulating, based on a carrier frequency, an original signal having a frequency that changes with time, and emits the transmission signal. In another example, the distance measuring apparatus 100 generates a transmission signal by modulating, based on a carrier frequency, an original signal having a frequency that linearly changes with time for a single period, and emits the transmission signal.

For example, the distance measuring apparatus 100 converts an original signal having a frequency that changes by an FMCW scheme to a transmission signal having a high frequency, to emit the transmission signal within an allowed frequency band. In an example, an original signal having a low frequency is converted to a transmission signal having a high frequency, based on a carrier frequency. In this example, the transmission signal may be referred to as a "carrier signal" or a "carrier wave."

The reception signal is converted to the original signal based on a carrier frequency. In an example, a reception signal having a high frequency is converted to an original signal having a low frequency based on a carrier frequency. In another example, when an original signal is modulated by an FMCW scheme, the original signal demodulated from a reception signal has a phase delay corresponding to a TOF delay, in comparison to an original signal that is not modulated to a transmission signal.

Figure 3:
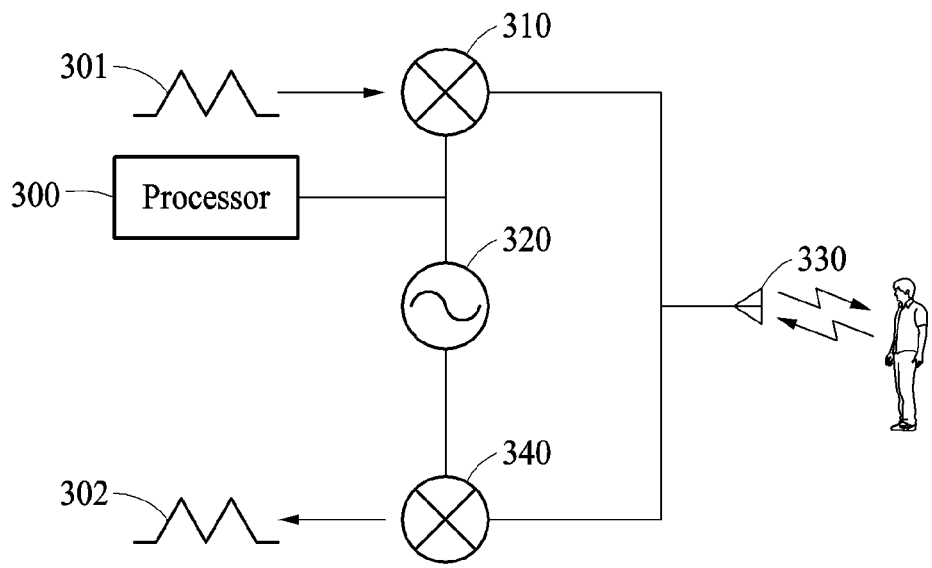
FIG. 3 illustrates an example of an apparatus to measure a distance to an object using a RADAR antenna.

FIG. 3 illustrates an example of a configuration of an apparatus to measure a distance to an object using a RADAR antenna.

The distance measuring apparatus 100 of FIG. 1 includes at least one processor, for example, a processor 300, and an antenna 330. For example, a transmission signal is transmitted by the RADAR antenna, and a reception signal is received by the RADAR antenna. In an example, the distance measuring apparatus 100 further includes an oscillator 320, an upconverter 310 and a downconverter 340.

The processor 300 emits a transmission signal using the antenna 330 while changing a frequency over time. In an example, the processor 300 periodically emits, as a transmission signal, an original signal having a frequency that changes with time. In another example, the processor 300 periodically emits, as a transmission signal, an original signal having a frequency that linearly changes with time for a single period. The processor 300 uses, for example, an FMCW scheme to generate an original signal.

The processor 300 receives, using the antenna 330, a reception signal coming from an object in response to the transmission signal being reflected from the object. When the transmission signal is reflected from the object, the transmission signal may change, but a level of the change may be negligible. A phase delay between the transmission signal and the reception signal occurs. The phase delay corresponds to a sum of an amount of time in which the transmission signal is emitted and arrives at the object and an amount of time in which the reception signal arrives at the antenna 330. The processor 300 calculates a distance to the object based on the phase delay.

The processor 300 samples a beat frequency in a sampling range that changes based on the beat frequency. The beat frequency indicates a difference between a frequency of the transmission signal and a frequency of the reception signal. In an example, when a beat frequency decreases, a sampling range used by the processor 300 to sample a reception signal becomes narrower. In this example, even a minute difference between relatively low beat frequencies is measured, and thus it is possible to increase an accuracy of a measurement of a short distance.

In another example, when a beat frequency increases, a sampling range used by the processor 300 to sample a reception signal becomes narrower. In this example, even a minute difference between relatively high beat frequencies is measured, and thus it is possible to increase an accuracy of a measurement of a long distance.

In still another example, when a beat frequency is closer to a threshold value, a sampling range used by the processor 300 to sample a reception signal becomes narrower. Thus, the sampling range is narrowed when the beat frequency becomes substantially equal to a threshold value. In this example, even a minute difference between beat frequencies close to the threshold value is measured, and thus it is possible to increase an accuracy of a measurement of a distance corresponding to a beat frequency with a threshold value. narrowing, in response to the The processor 300 calculates a distance to the object based on a sampling result. For example, the processor 300 calculates a distance from a vehicle to the object based on a frequency shift between the transmission signal and the reception signal and a variation in a frequency of the transmission signal over time.

The oscillator 320 generates a carrier frequency. For example, when the upconverter 310 modulates an original signal having a low frequency to a transmission signal having a high frequency, the oscillator 320 provides a carrier frequency. The upconverter 310 modulates the original signal in an allowed frequency band based on the carrier frequency.

In an example, the processor 300 periodically modulates an original signal having a frequency that changes with time to a transmission signal having a high frequency, based on a carrier frequency, and emits the transmission signal. In another example, the processor 300 periodically modulates an original signal having a frequency that linearly changes with time for a single period to a transmission signal having a high frequency, based on a carrier frequency, and emits the transmission signal. The processor 300 uses, for example, an FMCW scheme to generate an original signal.

The processor 300 receives, using the antenna 330, a reception signal coming from an object in response to the transmission signal being reflected from the object. For example, when the downconverter 340 demodulates a reception signal having a high frequency to an original signal having a low frequency, the oscillator 320 provides a carrier frequency. The downconverter 340 demodulates the original signal having the low frequency from the reception signal based on the carrier frequency.

The processor 300 samples a beat frequency indicating a difference between a frequency of an original signal that is not modulated to the transmission signal and a frequency of an original signal demodulated from the reception signal, in a sampling range that changes based on the beat frequency. For example, the processor 300 performs analog-to-digital conversion (ADC) on the sampling result. The processor 300 performs windowing on a result obtained by performing the ADC, extracts a value of the sampling range using a fast Fourier transform (FFT), and calculates a speed using a Doppler FFT.

Figure 4:
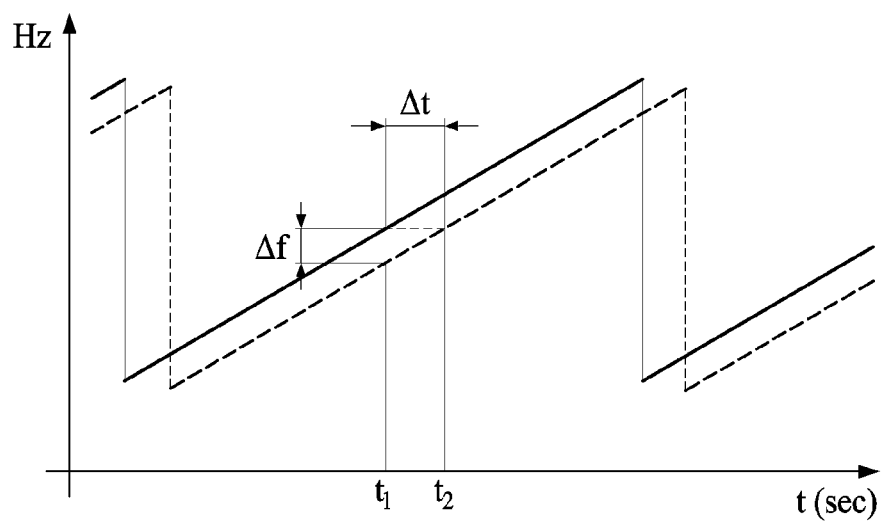
FIG. 4 illustrates an example of a frequency difference between a transmission signal and a reception signal over time.

FIG. 4 illustrates an example of a frequency difference between a transmission signal and a reception signal over time.

The distance measuring apparatus 100 of FIG. 1 calculates a distance to an object based on a difference between a frequency of the transmission signal and a frequency of the reception signal. Referring to FIG. 4, a solid line represents a transmission signal of a RADAR, and a dashed line represents a reception signal that comes from the object when the transmission signal is reflected from the object.

Based on Equation 1 shown below, the distance measuring apparatus 100 calculates a distance R from a vehicle to an object based on a difference $\Delta f$ between the frequency of the transmission signal and the frequency of the reception signal and a variation df/dt in the frequency of the transmission signal over time.

Referring to Equation 1, the distance measuring apparatus 100 calculates the distance R based on a delay time $\Delta t$ between the transmission signal and the reception signal. For example, the distance measuring apparatus 100 calculates a distance from a vehicle to an object based on a speed of each of the transmission signal and the reception signal and a delay time between the transmission signal and the reception signal.

$$R = \frac{C_0 \times |\Delta t|}{2} = \frac{C_0 \times |\Delta f|}{2 \times (df/dt)} \qquad \text{[Equation 1]}$$

Referring to Equation 2 shown below, a distance between a vehicle and an object and a speed of the object are calculated based on the delay time $\Delta t$ and frequency shifts $\delta f_u$ and $\delta f_d$.

$$f_D = \frac{(\delta f_u + \delta f_d)}{2} \qquad \text{[Equation 2]}$$

Figure 5A:
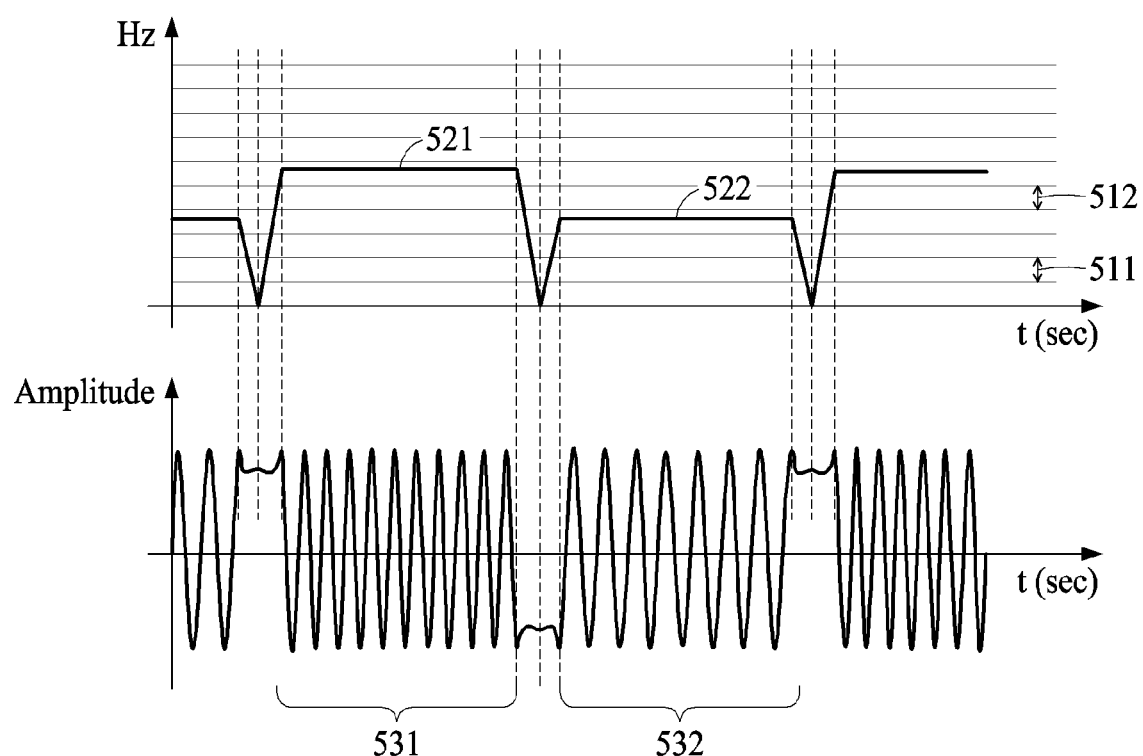
FIG. 5A illustrates an example in which a sampling range remains unchanged regardless of a beat frequency.

FIG. 5A illustrates an example in which a sampling range remains unchanged regardless of a beat frequency.

FIG. 5A illustrates a high beat frequency 521 and a low beat frequency 522. For example, by a frequency modulation using an FMCW scheme, a frequency shift corresponds to a distance from a vehicle to an object. The high beat frequency 521 corresponds to a reception signal received from an object located at a long distance, and the low beat frequency 522 corresponds to a reception signal received from an object located at a short distance.

Similarly, in a time-amplitude graph, a signal 531 corresponds to the high beat frequency 521, and accordingly corresponds to the reception signal received from the object at the long distance. Also, a signal 532 corresponds to the low beat frequency 522, and accordingly corresponds to the reception signal received from the object at the short distance.

For example, when an object is located at a distance from a vehicle, a braking distance of the vehicle is sufficiently secured, and accordingly a risk of a collision with the object may be avoided. However, when an object is located close to the vehicle, the object needs to be quickly identified due to a short braking distance.

Referring to FIG. 5A, a sampling range 512 corresponding to a high beat frequency is the same as a sampling range 511 corresponding to a low beat frequency. When sampling ranges have the same size, a considerable amount of resources is allocated to even measure a distance to a distant object that is relatively not significant, and accordingly resources to measure a distance to a close object that is relatively significant may be insufficient. In an example of a low accuracy for a close object, it is difficult to precisely measure a variation in a beat frequency, and a probability of identification of an object is reduced due to a decrease in a capability to sense a Doppler frequency.

Figure 5B:
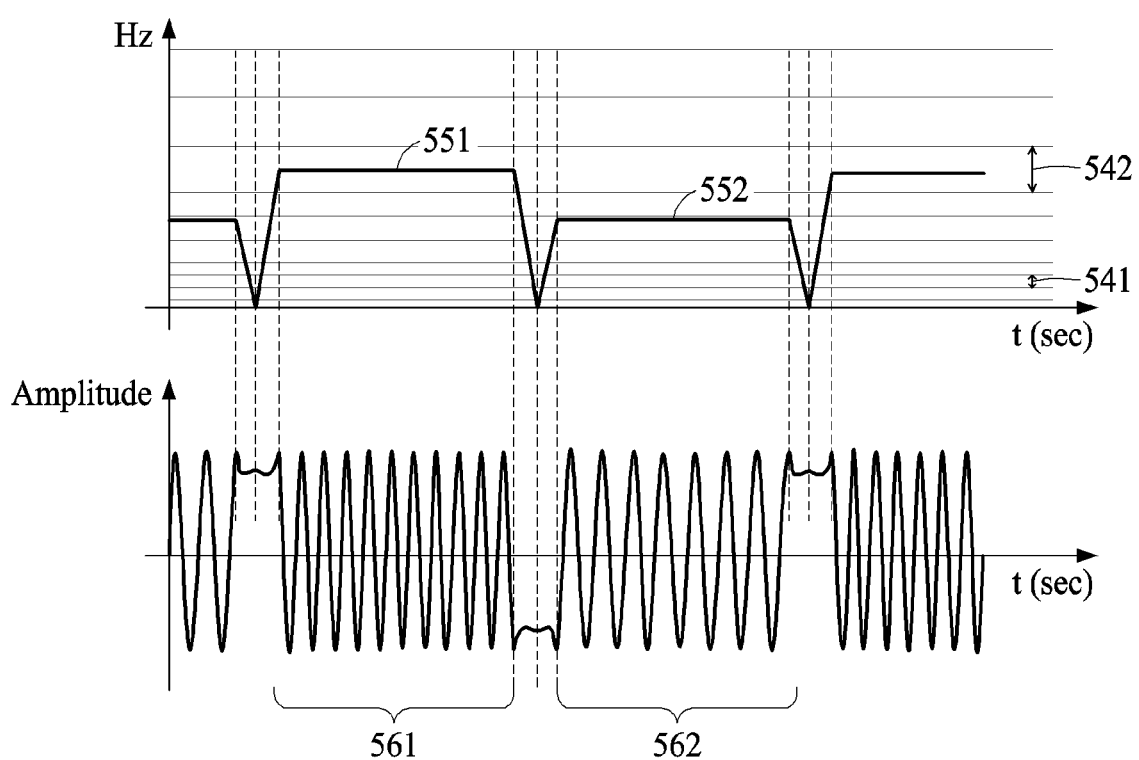
FIG. 5B illustrates an example in which a sampling range changes based on a beat frequency.

FIG. 5B illustrates an example in which a sampling range changes based on a beat frequency.

FIG. 5B illustrates examples of a sampling range. A beat frequency 551 corresponds to a reception signal received from an object located at a long distance, and a beat frequency 552 corresponds to a reception signal received from an object located at a short distance. Similarly, in a time-amplitude graph, a signal 561 corresponds to the beat frequency 551, and accordingly corresponds to the reception signal received from the object at the long distance. Also, a signal 562 corresponds to the beat frequency 552, accordingly corresponds to the reception signal received from the object at the short distance.

A sampling range 542 to sample a high beat frequency is greater than a sampling range 541 to sample a low beat frequency. Because the sampling range 541 is relatively narrow, a frequency variation is more accurately measured in a range of relatively low beat frequencies.

According to examples, a sampling range non-linearly increases as a beat frequency increases. For example, when a beat frequency increases, a sampling range exponentially increases. A rate of an increase in a sampling range varies depending on an increase in a beat frequency.

The distance measuring apparatus 100, oscillator 320, upconverter 310, and downconverter 340, and other apparatuses, units, modules, devices, and other components described herein with respect to FIGS. 1 and 3 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. The hardware components also access, manipulate, process, create, and store data in response to execution of the instructions or software. For simplicity, the singular term "processor" or "computer" may be used in the description of the examples described in this application, but in other examples multiple processors or computers may be used, or a processor or computer includes multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIG. 2 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent after gaining a thorough understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A distance measuring method comprising:
emitting a transmission signal while changing a frequency over time;
receiving a reception signal from an object, in response to the transmission signal being reflected from the object;
adjusting a sampling frequency range to be a first sampling frequency range and sampling a beat frequency in the first sampling frequency range in response to the beat frequency being a first beat frequency;
adjusting the sampling frequency range to be a second sampling frequency range and sampling the beat frequency in the second sampling frequency range in response to the beat frequency being a second beat frequency; and
determining a distance to the object based on the sampling,
wherein the beat frequency indicates a difference between the frequency of the transmission signal and a frequency of the reception signal,
wherein the first sampling frequency range is less than the second sampling frequency range, and
wherein the first beat frequency is less than the second beat frequency.

2. The distance measuring method of claim 1, wherein the frequency of the transmission signal changes with time.

3. The distance measuring method of claim 1, wherein the frequency of the transmission signal linearly changes with time for a single period.

4. The distance measuring method of claim 1, wherein the determining of the distance comprises calculating the distance to the object based on the difference between the frequency of the transmission signal and the frequency of the reception signal.

5. The distance measuring method of claim 1, further comprising
converting an original signal having a low frequency to the transmission signal having a high frequency, based on a carrier frequency, and
converting the reception signal to the original signal based on the carrier frequency.

6. The distance measuring method of claim 1, wherein
the transmission signal is transmitted by a radio detection and ranging (RADAR) antenna, and
the reception signal is received by the RADAR antenna.

7. The distance measuring method of claim 1, wherein the sampling frequency range varies based on the distance of the object from the vehicle.

8. The distance measuring method of claim 1, further comprising:
narrowing the sampling frequency range, in response to the beat frequency being equal to a threshold value.

9. The distance measuring method of claim 1, further comprising:
narrowing the sampling frequency range, in response to a decrease in the beat frequency.

10. A non-transitory computer-readable storage medium storing instructions that, when executed by a processor, cause the processor to perform the method of claim 1.

11. A distance measuring apparatus comprising:
an antenna,
a processor configured to:
emit a transmission signal using the antenna while changing a frequency over time;
receive a reception signal from an object using the antenna in response to the transmission signal being reflected from the object;
adjust a sampling frequency range to be a first sampling frequency range and sample a beat frequency the first sampling frequency range in response to the beat frequency being a first beat frequency, and
adjust the sampling frequency range to be a second sampling frequency range and sample the beat frequency in the second sampling frequency range in response to the beat frequency being a second beat frequency; and
determine a distance to the object based on the sampling,
wherein the beat frequency indicates a difference between a frequency of the transmission signal and a frequency of the reception signal,
wherein the first sampling frequency range is less than the second sampling frequency range and the first beat frequency is less than the second beat frequency.

12. The distance measuring apparatus of claim 11, wherein the frequency of the transmission signal linearly changes with time for a single period.

13. The distance measuring apparatus of claim 11, wherein the processor is further configured to determine the distance to the object based on the difference between the frequency of the transmission signal and the frequency of the reception signal.

14. The distance measuring apparatus of claim 11, further comprising:
an oscillator configured to generate a carrier frequency;
an upconverter configured to convert an original signal having a low frequency to the transmission signal having a high frequency based on the carrier frequency; and
a downconverter configured to convert the reception signal to the original signal based on the carrier frequency.

* * * * *